(12) United States Patent
Langlois et al.

(10) Patent No.: US 7,737,577 B2
(45) Date of Patent: Jun. 15, 2010

(54) POWER SUPPLY SYSTEM AND METHOD ON BOARD AN AIRCRAFT

(75) Inventors: Olivier Langlois, Colomiers (FR); Lucien Prisse, Toulouse (FR); Etienne Foch, Toulouse (FR); Dominique Alejo, Saint-Gauzens (FR)

(73) Assignee: Airbus France, Toulouse (FR)

( * ) Notice: Subject to any disclaimer, the term of this patent is extended or adjusted under 35 U.S.C. 154(b) by 138 days.

(21) Appl. No.: 11/877,278

(22) Filed: Oct. 23, 2007

(65) Prior Publication Data

US 2008/0100136 A1 May 1, 2008

(30) Foreign Application Priority Data

Oct. 25, 2006 (FR) .................................. 06 54513

(51) Int. Cl.
*B60L 1/00* (2006.01)
*H02J 3/38* (2006.01)
(52) U.S. Cl. ......................................... 307/19; 307/9.1
(58) Field of Classification Search ................... 307/45, 307/19, 9.1, 18; 700/36
See application file for complete search history.

(56) References Cited

U.S. PATENT DOCUMENTS

| | | | |
|---|---|---|---|
| 5,191,520 A | 3/1993 | Eckersley | |
| 5,460,244 A | 10/1995 | Tanahashi | |
| 5,477,091 A | 12/1995 | Fiorina et al. | |
| 6,037,752 A * | 3/2000 | Glennon | 322/22 |
| 6,188,591 B1 | 2/2001 | Ruter et al. | |
| 6,411,865 B1 * | 6/2002 | Qin et al. | 700/286 |
| 7,400,065 B2 * | 7/2008 | Michalko | 307/44 |
| 7,439,634 B2 * | 10/2008 | Michalko | 307/43 |
| 2004/0160792 A1 | 8/2004 | Youm et al. | |
| 2007/0194625 A1 * | 8/2007 | Maier | 307/18 |
| 2008/0092258 A1 * | 4/2008 | Clarke et al. | 903/907 |

FOREIGN PATENT DOCUMENTS

| | | |
|---|---|---|
| DE | 42 24 755 A 1 | 2/1994 |
| DE | 197 39 917 A 1 | 3/1999 |
| FR | 2 684 250 A1 | 5/1993 |

OTHER PUBLICATIONS

Paul M. Anderson, et al., "Automated Power Distribution System Hardware", Conference Proceedings Article, XP10089773, Aug. 6, 1989, pp. 579-584.

* cited by examiner

*Primary Examiner*—Michael Rutland Wallis
(74) *Attorney, Agent, or Firm*—Oblon, Spivak, McClelland, Maier & Neustadt, L.L.P.

(57) ABSTRACT

A system and a power supply method, on board an aircraft, in which the power supply system of an aircraft includes several generators powering with 230 volts A.C. several distinct electrical cores, wherein the various loads of the aircraft are connected to each of these cores. Each core includes an input driver, several identical power modules, means of placing in parallel several power modules including interconnection inductances between power modules, and a switching matrix including a set of relays, means of piloting the relays of the switching matrix, so as to reconfigure all of these relays in the case of failure of a power module, several output filters, and relays of the switching matrix that may each be connected to at one load.

13 Claims, 6 Drawing Sheets

POWER SUPPLY SYSTEM AND METHOD ON BOARD AN AIRCRAFT

TECHNICAL FIELD

The present invention relates to a power supply system and a method, on board an aircraft.

In the following description, for reasons of simplification, by way of example, an aeroplane type of aircraft will be considered.

STATE OF THE PRIOR ART

Figure 1:
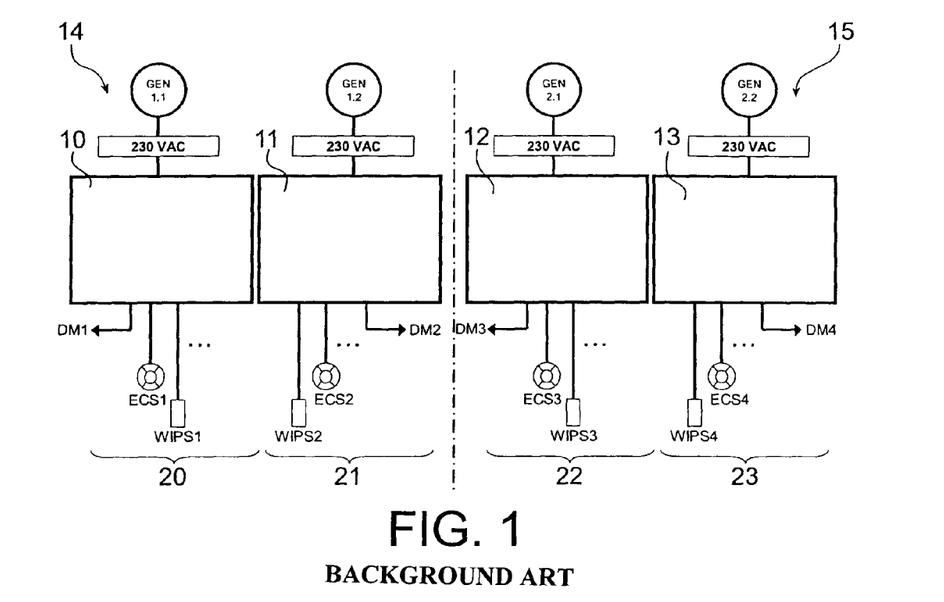
FIG. 1 shows diagrammatically an architecture of electrical generation/distribution of the prior art for a "more electrical" aeroplane of the "bleedless" type.

In future aeroplanes, the increase in part of electrical energy used will lead to an increase in the number of generators and electrical cores (or electrical housings). One example of the architecture of electrical generation and distribution is thus provided in FIG. 1. Four generators are shown GEN 1.1, GEN 1.2, GEN 2.1 and GEN 2.2 supplying with an alternating current (for example 230 VAC) four distinct electrical cores 10, 11, 12 and 13 for a first and a second side 14 and 15 of the aeroplane. The various electrical consumers (loads) of the aeroplane are connected to each of these cores. By way of example, the loads 20, 21, 22 and 23 which appear on this FIG. 1 are typical of a "more electrical" aeroplane without bleedless motors. In particular this concerns:

air conditioning units ECS1-ECS4 ("Environmental Conditioning System"),
Wing Ice Protection System elements WIPS1-WIPS4,
jet engine starter motors DM1-DM4.

The current trend is, in fact, that aeroplanes become "more electrical". It is even envisaged that they become "all electrical", wherein the electrical energy thus becomes the main source of energy.

In the scope of a "more electrical" aeroplane, the systems used are similar to those of the previous aeroplanes except that there is more electrical equipment.

Figure 2:
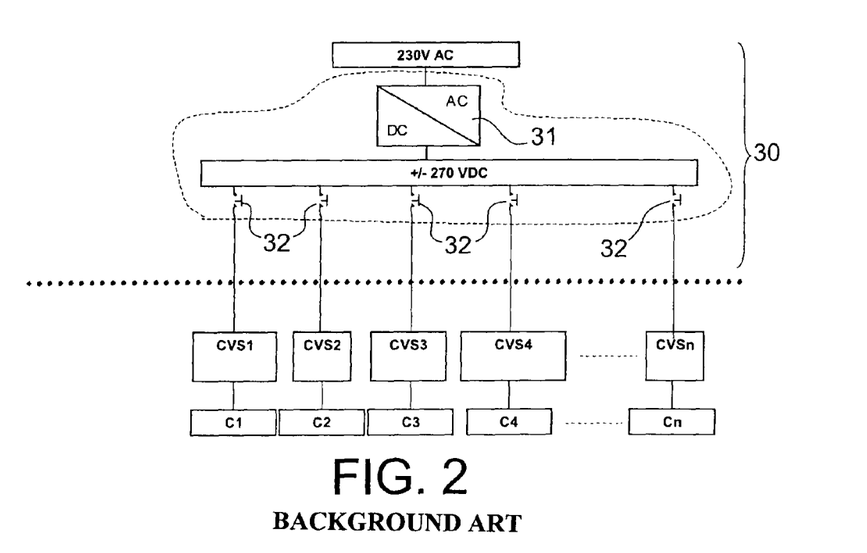
FIG. 2 shows a classic power supply for loads by means of power modules (static converters).

On a "more electrical" aeroplane network, the loads are often equipped with static converters (power electronics) which permit their operation to be controlled precisely. FIG. 2, which follows the philosophy of "one load, one converter", shows a power supply for each load C1, C2 . . . Cn by means of a power module (CVS1, CVS2 . . . CVSn).

Thus in this FIG. 2 for a given electrical core 30 powered with 230 volts A.C. and comprising an AC/DC converter 31 that is 230 volts A.C. to +/−270 volts D.C. (VDC) and has switches 32 is connected to the loads C1, C2 . . . Cn, respectively by means of power modules CVS1, CVS2 . . . CVSn.

Consequently, in this system of the known art, a load Ci is attributed to a single static converter CVSi. The following disadvantages result:

During a failure of a power module CVSi, the load Ci to which it is dedicated can no longer be powered.
the power modules CVS1, CVS2 . . . CVSn, with different powers, are not in the form of standard modules. It is therefore specific equipment that is costly and difficult to replace during maintenance.

The purpose of the invention is to improve such a system by mutualising the power electronics on the aeroplane systems, which is to say by using power modules common to several user systems by reducing the volume and the weight of the group of power modules on board and by avoiding any oversizing due to a specific downgraded mode.

DESCRIPTION OF THE INVENTION

The invention relates to a power supply system of an aircraft for example an aeroplane, comprising several generators powering with 230 volts A.C. several distinct electrical cores, wherein the various loads of the aeroplane are connected to each one of these cores, characterised in that each core comprises:

one input driver,
several identical power modules,
means for placing in parallel several power modules comprising interconnection inductances between power modules, and a switching matrix comprising a set of contactors,
means for piloting the contactors of the switching matrix, so as to reconfigure all of these contactors in the event of the failure of a power module,
several output filters,
contactors of the switching matrix that may each be connected to at least one load.

Advantageously the system further comprises:

preload systems permitting the power supply and the protection of the power components,
grouped command electronics associated to each power module;
a supervisor which manages the different configurations according to the state of the system and the requests.

Advantageously the input driver comprises an AC/DC converter and isolating contactors equipped with a preload system.

Advantageously a power module comprises:

power supply inputs +/−270 VDC,
a network connection, permitting a connection to the supervisor,
a synchronisation line, permitting a connection to the other modules,
semiconductor power components,
igniters permitting the ignition and the extinction of the power components,
outputs to a load,
a control board,
interconnection inductances.

Advantageously the power modules are standard modules. Several power modules may be placed in parallel.

The AC/DC converter of the input driver may be made from any type of rectifier, for example:

a simple diode rectifier,
one or several power modules CVS (active or passive) placed in parallel.

The invention also relates to a method for using this system in which at least one "power module"—"load" assembly is configured. Several power modules may be placed in parallel. Several functions may be carried out with each of the power modules.

The invention allows the difficulties related to the increase of the electrical equipment in an aeroplane to be resolved. The invention is based on the mutualisation of power modules, in the aim of limiting the total installed power. The mutualisation, completed by the standardisation of these power modules, facilitates maintenance, and improves the reliability and availability, whilst limiting the weight on board.

The invention has many advantages, in particular:

the installation of power modules in the electrical cores, and not just in the loads, permits the power electronics to be regrouped in the same place, and thus facilitates the maintenance operations.
the adoption of standard power modules that are all identical permits the power electronics to be standardised, and thus to improve the reliability whilst reducing the costs.

the possibility of placing in parallel several power modules permits the apparent power of the electronic power to be increased to supply high loads.

the possibility of reconfiguring the "power modules"—"loads" associations according to their availability permits the availability of the system to be improved in the event of a failure.

the possibility of carrying out several functions with these power modules (inverter, rectifier, chopper, etc. . . . ) makes possible many uses of the power modules according to the requirements.

The invention also relates to an aircraft featuring a system as defined above.

DETAILED DESCRIPTION OF SPECIFIC EMBODIMENTS

Figure 3:
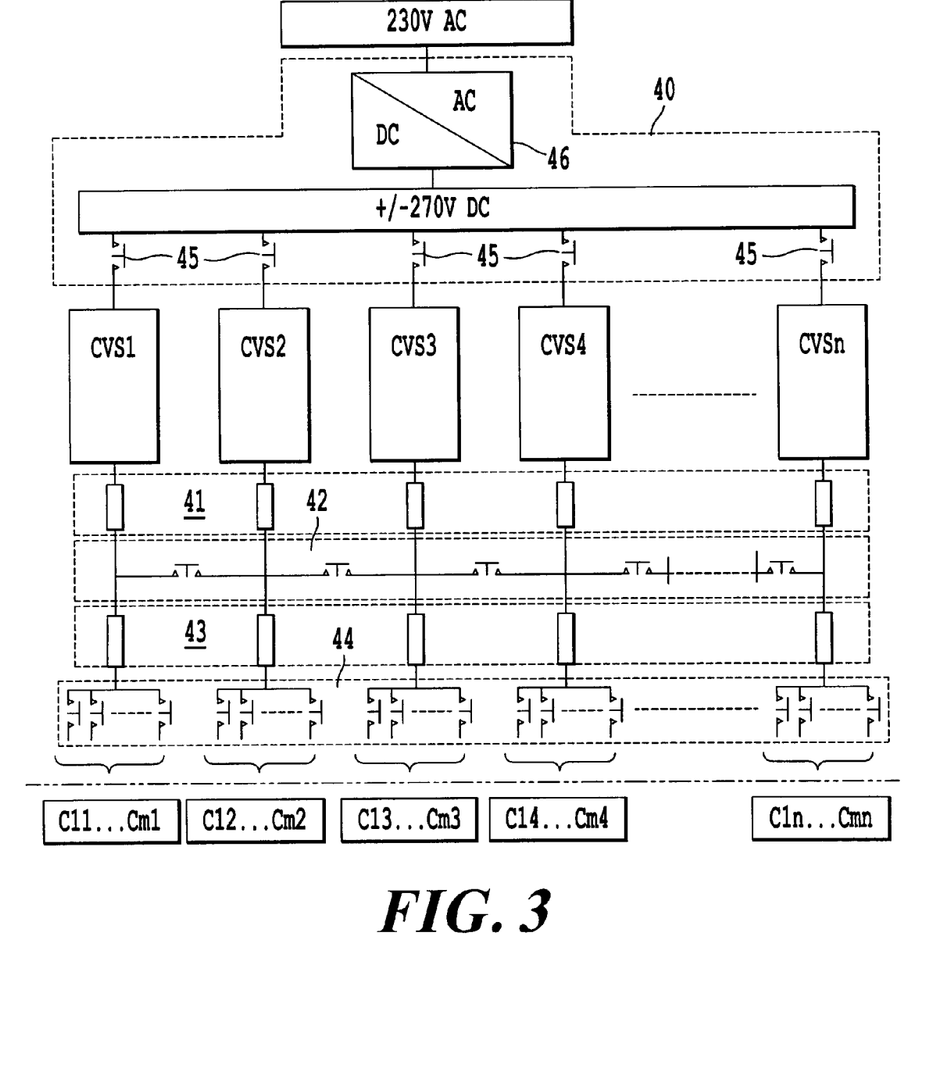
FIG. 3 shows the system of the invention.

The power supply system of the invention, as illustrated in FIG. 3, comprises an electrical core, for example one of the cores 10 . . . 13 shown in FIG. 1, of which the power part comprises:
- an input driver 40 (rectifier 46 and preload system not illustrated);
- three-phase power modules $CVS_1 \ldots CVS_n$ (all identical);
- inductances 41 for interconnection between power modules;
- a switching matrix 42 formed by contactors capable of connecting at least two power modules in parallel via the inductances 41;
- output filters 43,
- switching units 44 each capable of being connected to at least one load Cij.

Figure 4:
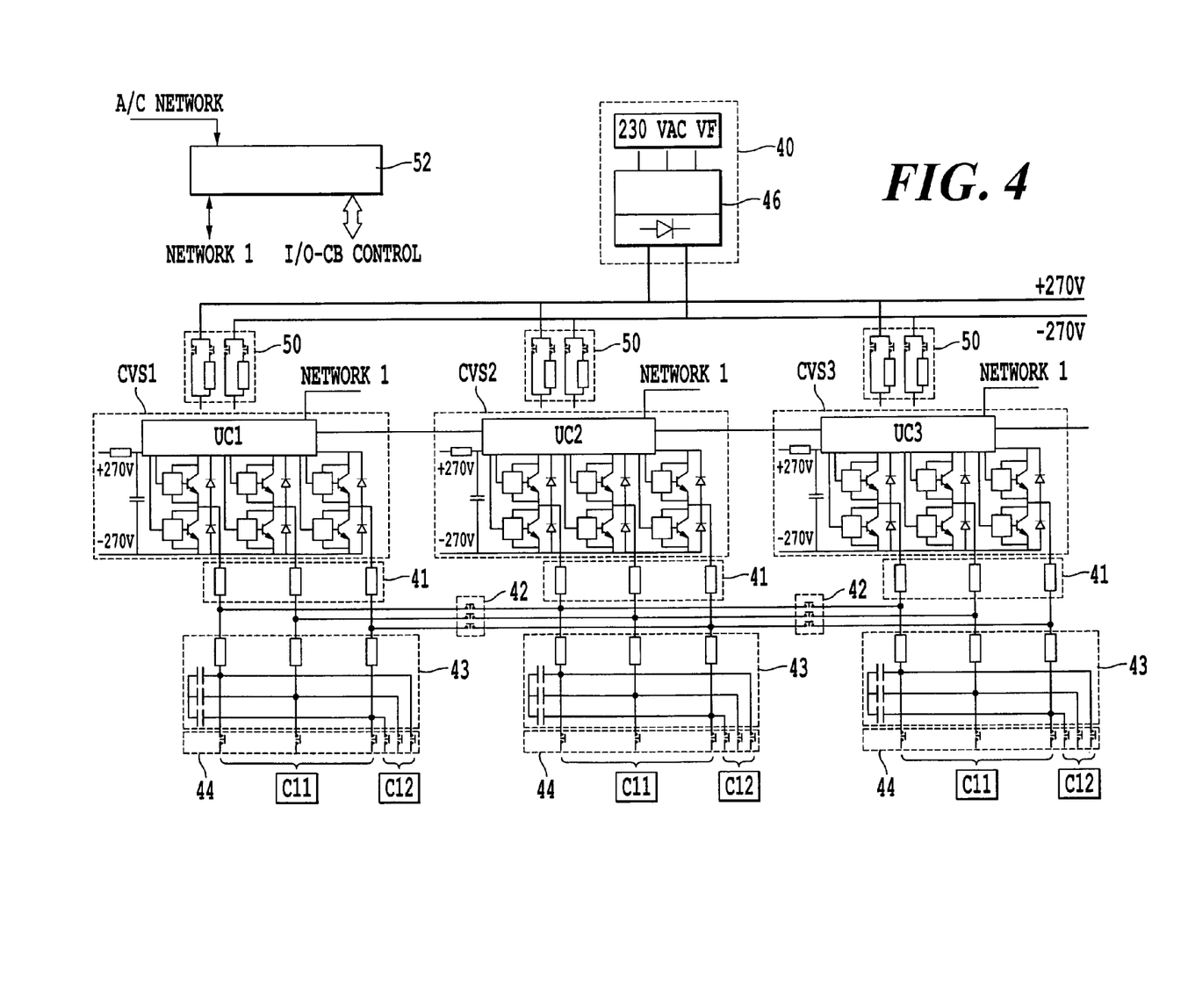
FIG. 4 shows one embodiment of the system of the invention.

In FIG. 4, which shows one embodiment of the system of the invention, the elements already illustrated in FIG. 3 can be found, which is to say:
- the input driver 40,
- the power modules CVS1-CVS3,
- the interconnection inductances 41,
- the output filters 43,
- the switching matrix 42, 44.

In addition, there are for the command:
- preload systems 50 permitting the ignition, the extinction and the protection of the power components;
- grouped command electronics UC1, UC2, UC3 associated to each power module CVS1, CVS2, CVS3;
- a supervisor 52 which manages the different configurations according to the state of the system and the requests.

The system of the invention uses power standard modules CVSi, which have the specific characteristic of having a strictly identical constitution.

These power modules CVSi may be positioned directly in the electrical cores. A matrix of contactors 42, 44, also positioned in the cores, permits several power modules CVSi to be coupled in parallel and thus to dispose of higher power. The number of power modules to be placed in parallel depends on the load Ci to be powered, and varies during the flight of the aeroplane.

Below will be analysed more precisely each of the elements illustrated in FIGS. 3 and 4:

1. The Input Driver

Figure 7:
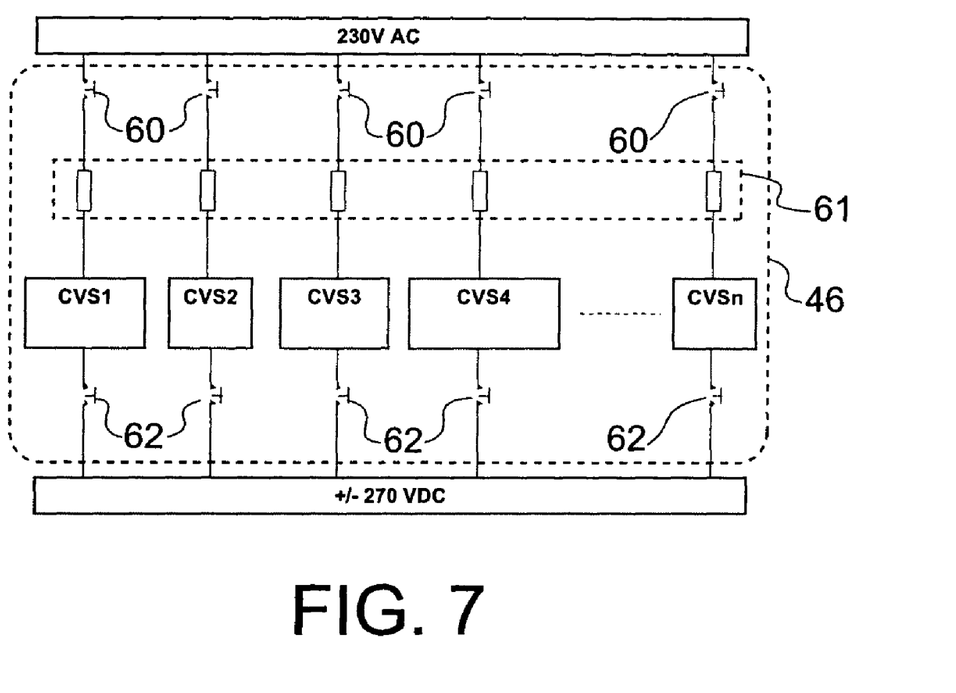
FIG. 7 shows one embodiment of the input driver.

This input driver 40 comprises an AC/DC converter 46 and isolating contactors 45 equipped with a preload system 50. The AC/DC converter 46 may be made, for example, with various types of rectifier, varying from a simple diode bridge to the association of n power standard modules in parallel. As illustrated in FIG. 7, one embodiment of this AC/DC converter 46 may comprise:
- first switches 60,
- interconnection inductances 61,
- power modules CVS1, CVS2 . . . CVSn,
- second switches 62.

Consequently it may be made with standard modules.

In the event of the failure of a power module CVSi, it may be disconnected via its isolating contactor 45.

2. The Preload Systems

A preload system 50 permits a power module CVSi to be connected to the bus +/−270 volts D.C. without generating a current surge on it.

A preload system 50 may be simply made with a resistor in series with the electrical circuit. This resistor is then short-circuited with a contactor after the time required by the preload for the capacitors present in the circuit.

3. The Power Modules

All the power modules $CVS_1 \ldots CVS_n$ are identical and are of the three-phase type. They may be placed in parallel by means of interconnection inductances 41 and by contactors 42 designed for this purpose illustrated in FIG. 4.

Each of these power modules CVSi has its own igniter board for the ignition, the extinction and the protection of the power components. Such an igniter board communicates with the grouped UCi command that is dedicated to the power module. This grouped UCi control board contains the pilot unit(s) of the CVSi power modules. The switching from one pilot unit to another is made upon the request from the supervisor 52. This switching depends on the state of the system or a request from the aeroplane.

Figure 5:
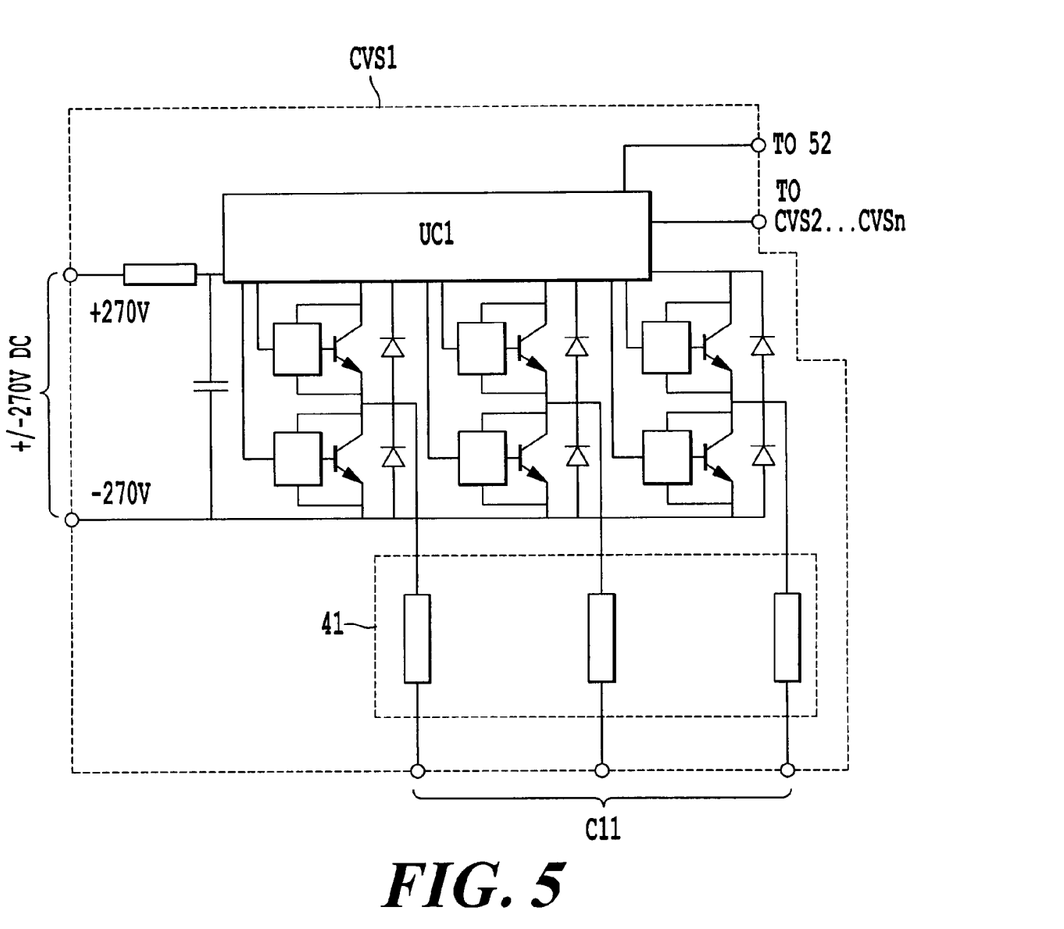
FIG. 5 shows one example of the constitution of a power module of the invention.

FIG. 5 shows one embodiment of a power module CVS1. This power module comprises:
- power supply inputs +/−270 volts D.C. (VDC),
- a network connection, permitting a connection to the supervisor 52,
- a synchronisation line, permitting a connection to the other modules CVS2 . . . CVSn,
- power components (IGBT . . . ),
- igniters permitting the ignition and the extinction of the power components in satisfactory conditions,
- outputs to a load C11,
- a control board UC1,
- interconnection inductances 41.

This equipment forms a three-phase bridge, bi-directional in terms of current and controlled.

4. The Interconnection Inductances

The interconnection inductances 41 permit the circulation currents between the power module arms CVSi to be limited when these same power modules are placed in parallel. The commands of the arms of n modules placed in parallels may be either synchronous, or shifted by $2 \cdot \pi/n$. Placing power modules in parallel permits the power to be increased to be transmitted to pilot a load, in a downgraded mode for example.

5. The Switching Matrix

The switching matrix 42, 44 comprises a set of contactors which permit several power modules CVSi to be placed in parallel, the reconfiguration of the unit in the event of failure of one of the power modules and the power supply of the different loads Ci. These contactors are commanded by the supervisor 52 according to the state of the system (failure of one of the components) and the requests from the aeroplane.

6. The Output Filters

The output filters 43 permit a satisfactory quality of voltage to be obtained, either for reasons of electromagnetic compatibility (EMC), or for reasons of network quality related to the loads.

7. The Supervisor

Based on requests from the aeroplane and the state of the system, the supervisor 52 permits the various contactors of the switching matrix 42, 44 to be piloted and to generate the command waves for the different power modules CVS1-CVSn.

The architecture of the invention thus described allows any load to be powered by any power module, given that the notion of load must be widened. In fact, the hangar sockets may be considered as loads, and this requires certain power modules to operate as rectifiers in certain operating phases of the aeroplane. The power modules therefore have reversible power, which is naturally provided by the structure presented in FIG. 5.

This architecture is intrinsically fault tolerant: a power module can compensate for another power module as they are all identical.

This architecture permits certain downgraded modes to be used by placing power modules in parallel and thus increasing the power available for a load.

A power module may power several loads and carry out different functions. For example the following functions may be carried out by a single power module:
 inverter for the air conditioning compressor (ECS: "Environmental Conditioning System"),
 sinus absorption rectifier,
 inverter for 115 volts A.C. 400 Hz network,
 inverter for 230 volts A.C. network,
 inverter for starting the jet engines of the aeroplane,
 chopper for powering the resistors of WIPS: "Wing Ice Protection System".

The invention thus permits the rate of use of the on board power modules to be improved, and also to reduce the on board weight.

The invention also permits the availability of the system to be improved, by using identical power modules that can carry out several functions.

Example of One Application

In one example of an application considering the mutualising of the converters for the air conditioning compressor (ECS), the starter motor, the 115 volts A.C. network and hangar sockets, an aeroplane is considered that comprises four electrical cores, as shown in FIG. 1. Each core:
 powers an ECS compressor,
 powers the starter motor,
 provides a 115 volts A.C. fixed frequency network,
 is connected to the hangar sockets.

The operation of such an electrical core is detailed in FIGS. 6A to 6F which each show the following cases A to F.

Case A: Nominal Mode

Figure 6A:
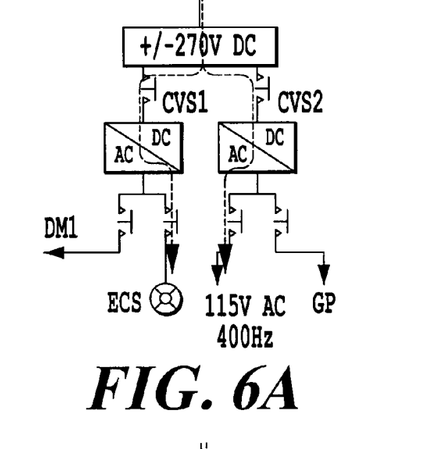
FIGS. 6A to 6F show examples of applications of the system of the invention.

The power module CVS1 operates as an inverter, and the piloting used is devoted to the compressor motor of this power module.

The power module CVS2 operates as an inverter and the piloting used permits the generation of a 115 volts A.C. 400 Hz network.

Case B: Starting the Engine

Figure 6B:
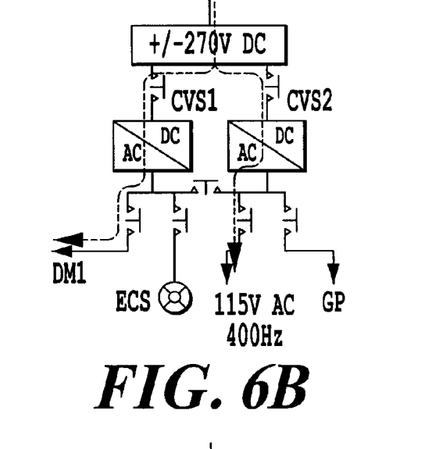

The power module CVS1 operates as an inverter and the piloting used is devoted to starting the engines of the aeroplane (DM1).

The power module CVS2 operates as an inverter and the piloting used permits the generation of a 115 volts A.C. 400 Hz network.

Case C: Air Conditioning Unit in Downgraded Mode

Figure 6C:
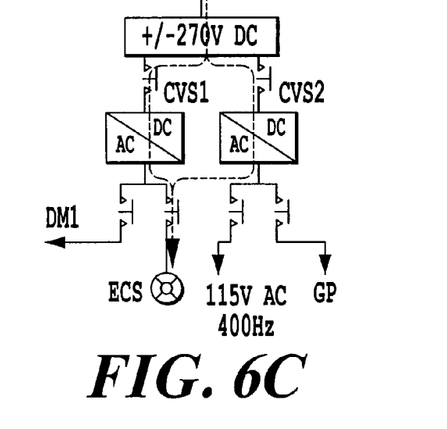

The opposed air conditioning unit ECS has broken down and the remaining air conditioning unit must provide 150% of its nominal power. To avoid over sizing the power module CVS1, the power module CVS2 is used in parallel with the power module CVS1 to permit this extra power to be transmitted. The two power modules CVS1 and CVS2 are connected in parallel by means of inductances and a contactor. The commands of these two power modules may be synchronous or shifted by $\pi$. The loads which were on the 115 volts A.C. network have been either redistributed to the three other 115 volts A.C. networks, or abandoned according to their degree of criticality.

Case D: Air Conditioning Unit Powered by Hangar Unit

Figure 6D:
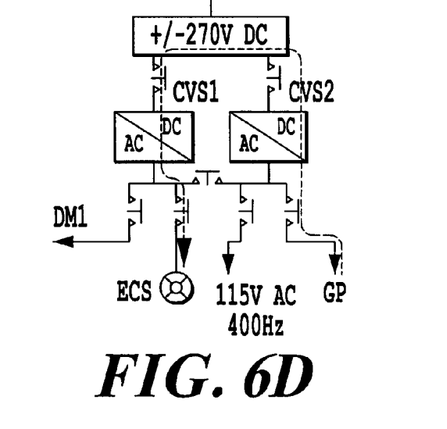

The power module CVS2 operates as a sinus absorption rectifier. From a 115 volts A.C. network sent from a hangar unit (or sockets) GP (case of an aeroplane on the ground), it creates a +/−270 volts D.C. network.

From the +/−270 volts D.C. network, the power module CVS1 powers the air conditioning unit ECS compressor.

Case E: Starting the Engines by Hangar Unit

Figure 6E:
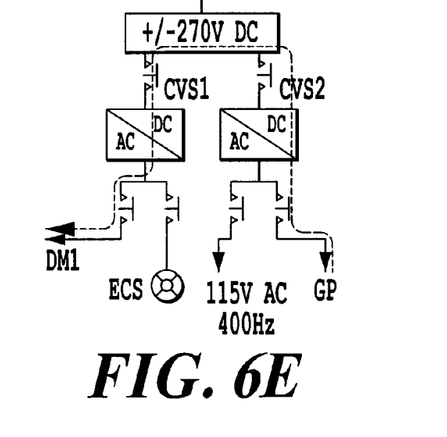

The power module CVS2 operates as a sinus absorption rectifier. From a 115 volts A.C. network, it creates a +/−270 volts D.C. network as in case D above.

From the +/−270 volts D.C. network, the power module CVS1 is used to start the engines of the aeroplane (DM1).

Case F: Failure of the Power Module CVS1

Figure 6F:
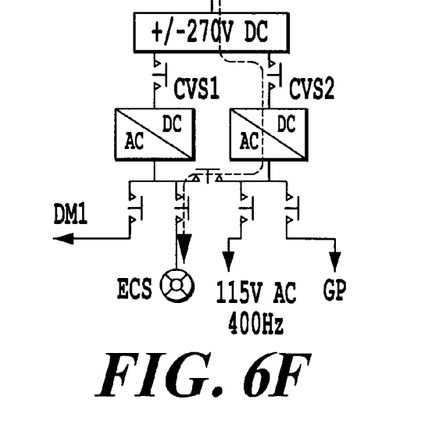

The power module CVS1 is broken down. The power module CVS2 then powers the air conditioning unit ECS compressor. The loads of the power module CVS2 are distributed to another power module.

In this example, it can be clearly seen that the two power modules CVS1 and CVS2 are used optimally:
 They carry out different functions.
 They power different types of loads.
 They permit the system to be reconfigured in the event of a failure.

The invention claimed is:

1. A power supply system of an aircraft, comprising:
 several generators powering with 230 volts A.C. several distinct electrical cores, wherein various loads of the aircraft are connected to each of these electrical cores, in which each electrical core includes:
 an input driver,
 several identical power modules, each power module of the several identical power modules includes a network connection permitting connection to a controller and a synchronization line permitting connection to the other power modules, means for placing in parallel the several power modules including interconnection inductances between the power modules, and a switching matrix including a set of relays, means for controlling the relays of the switching matrix, so as to reconfigure all of these relays in an event of failure of a power module, thus working power modules can provide power that the failed power module can no longer provide, several output filters, and relays of the switching matrix that may be connected to at least one load.

2. The system according to claim 1, further comprising preload systems permitting the power components to be powered and protected.

3. The system according to claim 2, further comprising grouped command electronics associated to each power module.

4. The system according to claim 2, further comprising a controller that manages the different configurations according to the state of the system and the requests.

5. The system according to claim 1, in which the input driver comprises an AC/DC converter and isolating relays equipped with a preload system.

6. The system according to claim 1, in which the power modules are standard modules.

7. The system according to claim 1, in which several power modules are positioned in parallel.

8. The system according to claim 5, in which the AC/DC converter is a diode rectifier.

9. The system according to claim 5, in which the AC/DC converter includes one or several power modules paired in parallel.

10. A method for implementing the system according to claim 1, in which several power modules are placed in parallel.

11. The method according to claim 10, in which several functions are carried out with each of the power modules.

12. An aircraft including the system of claim 1.

13. A power supply system of an aircraft, comprising:

several generators powering with 230 volts A.C. several distinct electrical cores, wherein various loads of the aircraft are connected to each of these electrical cores, in which each core includes:

an input driver, several identical power modules, means for placing in parallel the several power modules including interconnection inductances between the power modules, and a switching matrix including a set of relays, means for controlling the relays of the switching matrix, so as to reconfigure all of these relays in an event of failure of a power module, several output filters, and relays of the switching matrix that may be connected to at least one load; and each power module of the several identical power modules includes:

a power supply which inputs +/−270 volts D.C., a network connection, permitting a connection to a controller, synchronization line, permitting a connection to the other power modules, power semiconductor components, igniters permitting the ignition and the extinction of the power semiconductor components, outputs to a load, a control board, and interconnection inductances.

* * * * *